United States Patent [19]

Cusano et al.

[11] 4,415,808

[45] Nov. 15, 1983

[54] SCINTILLATION DETECTOR ARRAY EMPLOYING ZIG-ZAG PLATES

[75] Inventors: Dominic A. Cusano, Schenectady, N.Y.; Frank A. DiBianca, Mukwonago, Wis.

[73] Assignee: General Electric Company, Schenectady, N.Y.

[21] Appl. No.: 465,086

[22] Filed: Feb. 9, 1983

Related U.S. Application Data

[63] Continuation of Ser. No. 219,671, Dec. 24, 1980, abandoned.

[51] Int. Cl.³ ............................................... G01T 1/20
[52] U.S. Cl. .................................. 250/367; 250/363 S
[58] Field of Search .................... 250/363 S, 366, 367, 250/368, 483; 378/4, 7

[56] References Cited

U.S. PATENT DOCUMENTS

| | | | |
|---|---|---|---|
| 3,225,193 | 12/1965 | Hilton et al. | 250/367 |
| 3,936,645 | 2/1976 | Iversen | 250/367 |
| 4,187,427 | 2/1980 | Cusano | 250/367 |
| 4,234,792 | 11/1980 | DeCou et al. | 250/368 |
| 4,262,202 | 4/1981 | Cusano et al. | 250/367 |

*Primary Examiner*—Janice A. Howell
*Attorney, Agent, or Firm*—Marvin Snyder; James C. Davis, Jr.

[57] ABSTRACT

A scintillation detector array for use in computerized tomography comprises a housing having a wall section substantially transparent to x-ray or gamma-ray radiation and which has, disposed within, a plurality of adjacent, triangular prism shaped chambers. The chambers have alternate, oppositely disposed bases and contain a scintillation medium. A photodetector is mounted on the base of each of the chambers. The detector array converts x-ray intensity levels of impinging x-ray radiation to related electrical intensity levels.

12 Claims, 6 Drawing Figures

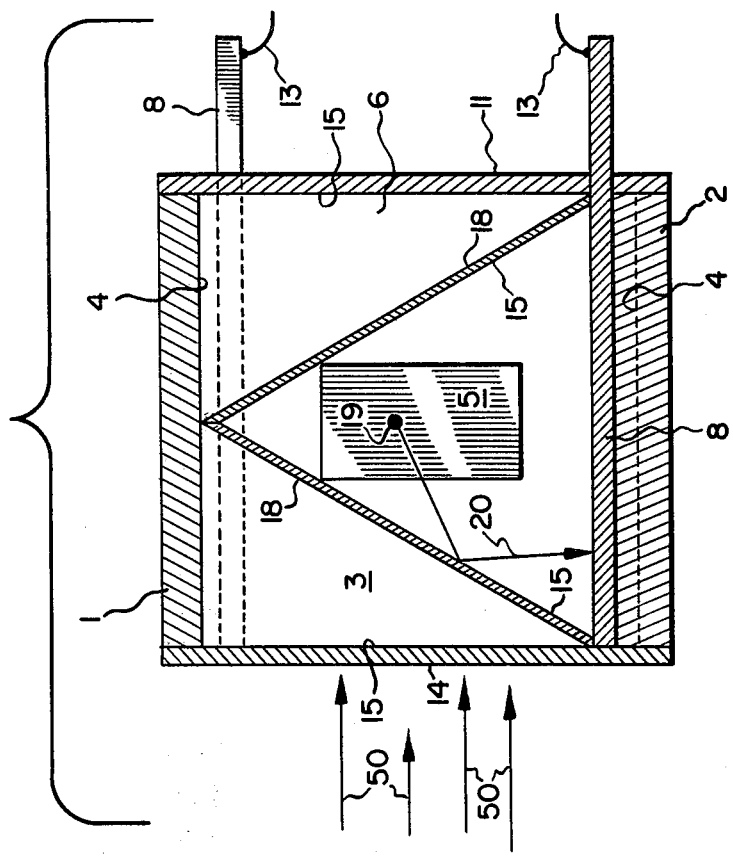
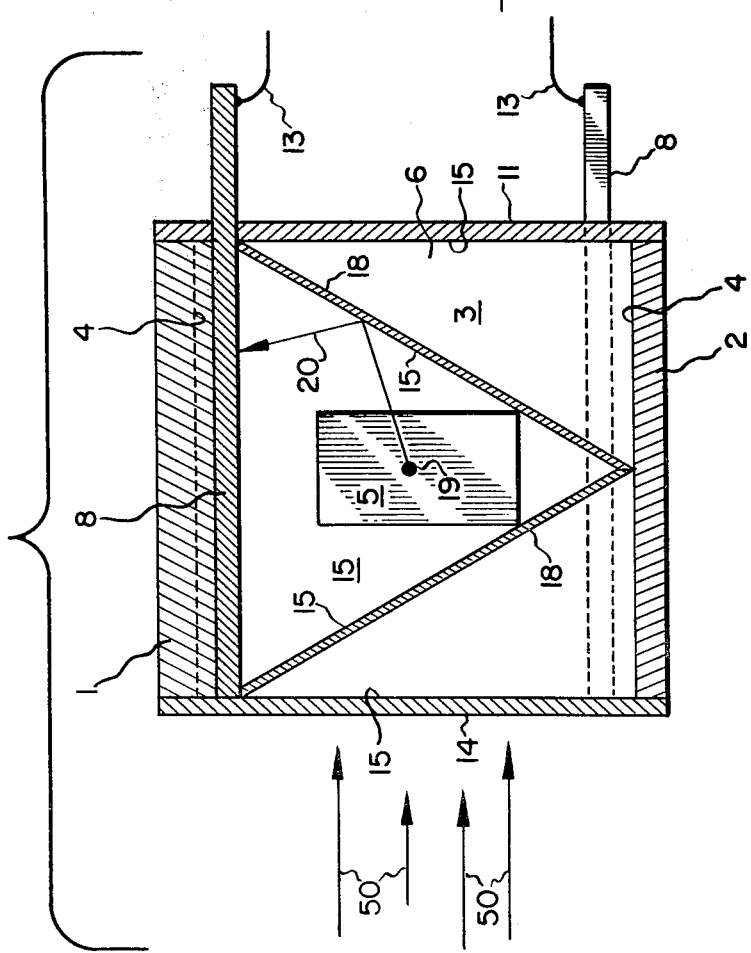

SCINTILLATION DETECTOR ARRAY EMPLOYING ZIG-ZAG PLATES

This application is a continuation of application Ser. No. 219,671, filed 12/24/80, now abandoned.

This application is a continuation of application Ser. No. 219,671, filed Dec. 24, 1980 now abandoned.

BACKGROUND OF THE INVENTION

This invention relates to x-ray or gamma ray detector arrays which are useful in computerized tomography scanners or related industrial applications. More specifically, the invention relates to a scintillation detector array in which the collimator/channel separator plates are arranged in a zig-zag configuration.

Computerized tomography (CT) scanners are medical diagnostic instruments in which the subject is exposed to a relatively planar beam or beams of x-ray radiation, the intensity of which varies in direct relationship to the energy absorption along a plurality of subject body paths. By measuring the x-ray intensity (i.e., the x-ray absorption) along these paths from a plurality of different angles or views, an x-ray absorption coefficient can be computed for various areas in any plane of the body through which the radiation passes. These areas typically correspond to an approximately square portion having dimensions of approximately 1 mm×1 mm. The absorption coefficients are used to produce a display of, for example, the bodily organs intersected by the x-ray beam.

An integral and important part of the scanner is the x-ray detector which receives the x-ray radiation which has been modulated by passage through the particular body under study. Generally the x-ray detector contains a scintillation material which, when excited by the impinging x-ray radiation, emits optical wavelength radiation. In typical CT or industrial applications, the optical output from the scintillator material is made to impinge upon photoelectrically responsive materials in order to produce an electrical output signal. The amplitude of this signal is in direct relation to the intensity of the impinging x-ray radiation. The electrical signals are converted to a digital form to be processed by digital computer means which generates the absorption coefficients in a form suitable for display on a cathode ray tube screen or other permanent media.

In the past, a parallel plate collimator/channel separator construction has been employed in scintillation detector arrays for use in CT. Two examples of such arrays are described, respectively, in U.S. Pat. No. 4,187,427 issued on Feb. 5, 1980 to D. A. Cusano (one of the inventors herein) and in U.S. Pat. No. 4,262,202 issued Apr. 14, 1981 to the same inventors as herein. The above-identified patents are assigned to the same assignee as the present invention and both are incorporated herein by reference.

The parallel plate scintillation detector array comprises a housing with a substantially x-ray transmissive front wall and a plurality of parallel collimator plates disposed orthogonal to the front wall and defining within the housing a plurality of substantially rectangular chambers, each containing a scintillation material. Photoelectrically responsive devices mounted on the top and bottom wall sections of the chamber receive optical radiation produced by excitation of the scintillation material by x-ray or gamma-ray radiation and produce in response thereto electrical output signals representative of the intensity of the impinging radiation.

The present invention represents an improvement in performance and reduction in cost compared to the parallel plate scintillation detector arrays described above.

The scintillation detector array in accordance with the invention comprises a housing having a front wall section substantially transparent to x-ray radiation. A plurality of side walls extending orthogonal to the front wall define adjacent triangular prism shaped chambers having alternate, oppositely disposed bases and containing a scintillation material. A photodetector positioned on the base of each chamber detects photons generated by x-rays which, having passed through the substantially x-ray transparent wall section, excite the scintillation material.

A higher signal-to-noise ratio is one of the performance improvements provided by the above-described inventive array structure. The improvement is due to the elimination of one-half of the total number of light-collecting photodetectors as compared to the parallel plate collimator/channel separator array which typically employs two photodetectors per chamber. More specifically, the higher signal-to-noise ratio results from the halved electrical capacitance associated with the reduced number of photodetectors, typically silicon photodiodes.

Other performance improvements include better compliance of the scintillator body to the chamber walls and greater dimensional uniformity of array chambers. This is achieved by employing accurately machined, wedge-shaped scintillator bars which are force fitted and essentially locked into place individually in each chamber. The resulting structure is a rigid symmetrical array which also exhibits reduced thermal sensitivity generally associated with geometrical distortion of incompletely filled parallel plate arrays. Additionally, the construction of the array provides improved light collection over the parallel plate one-photodiode per chamber array.

The improvements described above are significant since they permit the use of lower x-ray flux while providing superior image quality. This is particularly advantageous in medical tomography applications where it is desirable that the intensity of the x-ray be as small as possible to minimize the exposure of the patient. This is made additionally possible by the increased light-collecting efficacy of the inventive array. The chamber side walls are inclined to the photodetector and are preferably coated with specular material so that light emitted by the scintillator material is focused onto the photodetector.

Significant cost reduction is also provided by the triangular chamber configuration of the array. For example, the number of required photodetectors is reduced by half as is the number of accurately machined slots in the top and bottom array frames into which the collimator plates are fitted to form the triangular prism shaped chambers as compared to the parallel plate array. Cost reduction while retaining high efficacy and structural precision represents a significant advance since in order to obtain high quality imaging the detector array must be precisely constructed to provide a high degree of dimensional uniformity from channel (chamber) to channel.

With respect to precision and uniformity of construction, CT arrays are quite different from the two dimensional x-ray image converting screens which may employ photographic film or a planar array of photodiodes as the recording medium. In such screens, exemplified by U.S. Pat. No. 3,936,645 issued to Iversen on Feb. 3, 1976, the primary concern is to dissect or "discretize" the two-dimensional image conversion screen so as to avoid lateral scatter of x-rays and luminescence which usually limits the contrast and resolution of the image. The precise geometry of the individual cells (serpentine, square, hexagonal, or close-packed spheres, etc.) into which the originally continuous screen is divided is not of any particular significance so long as the intercellular divisions comprise an optically and/or radio-opaque material. In contrast, CT arrays require highly precise scintillator material shapes, scintillator thickness, collimator plate alignments, and reflectivities, just to cite a few examples. Hence the advantage of reducing the number of precision adjustments and fittings required in CT arrays is quite apparent.

These and other advantages and improvements provided by the present invention will be more fully described in the detailed description of the invention.

SUMMARY OF THE INVENTION

The scintillation detector array for use in computerized tomography includes a housing for supporting a plurality of adjacent triangular prism shaped chambers having alternately, oppositely disposed bases. The triangular prism shaped chambers are defined by side wall members (collimators) which are substantially opaque to x-ray radiation and which are oriented substantaily orthogonal to an essentially x-ray radiation transmissive housing front wall structure. A variety of scintillator materials may be employed in the scintillation detector in accordance with the invention. A photoelectrically responsive device is positioned on the base of each triangular chamber. If desired, the interior walls of the array may be coated with a reflective material to increase optical photon capture by the photoelectric devices. Additional x-ray transmissive, optically reflective plates may be positioned within each chamber at an angle to the housing front and rear wall members to further increase optical photon capture by the photoelectric devices.

Accordingly, it is an object of the present invention to provide a scintillation detector array which is operable with a variety of scintillator materials and which provides improved signal-to-noise performance and cost efficient construction.

Another object of the invention is to provide a scintillation detector array with reduced requirements for precision adjustments and fittings.

Still another object of the invention is to provide a scintillation detector array with a reduced number of photodetectors being required.

BRIEF DESCRIPTION OF THE DRAWINGS

FIGS. 4a and 4b are side sectional, views of an embodiment such as illustrated in FIG. 2, but additionally showing optional reflective structures to enhance photon capture by the photoelectric devices.

DETAILED DESCRIPTION OF THE INVENTION

Figure 1:
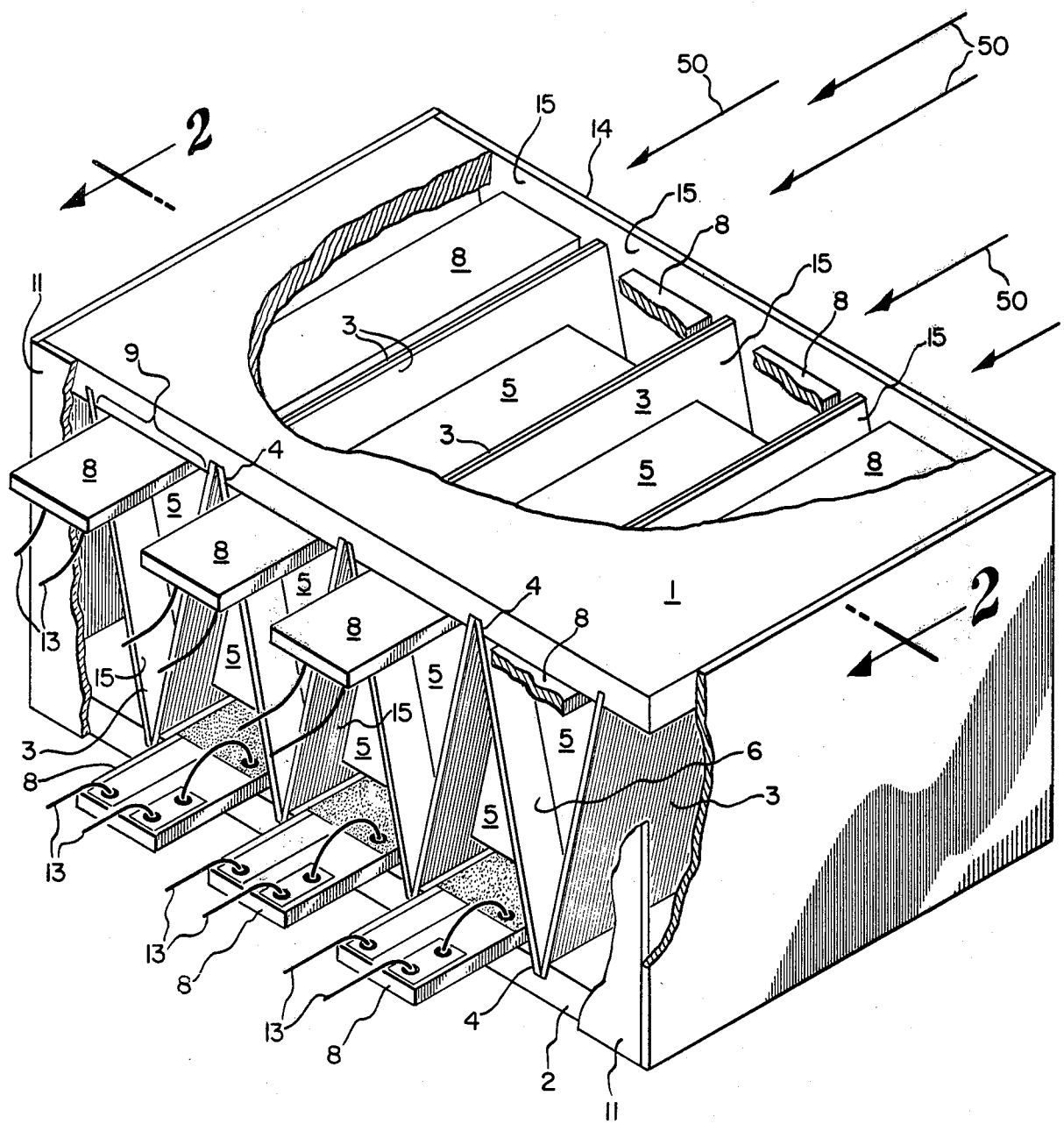
FIG. 1 is a perspective drawing illustrating an embodiment of the scintillation detector array of the present invention in which a wedge-shaped, scintillation material is disposed within each chamber.

FIG. 1 illustrates a collimated scintillator detector array structure in accordance with one embodiment of the present invention. Collimator plate members 3, front wall member 14, rear wall member 11, and upper and lower frame members 1 and 2, respectively, define a plurality of triangular prism shaped chambers 6 into which a variety of scintillator media may be placed. In the illustrated embodiment a wedge-shaped, solid scintillation material 5 is employed. However, uniform fill scintillation media such as a liquid scintillation medium similar to that described in the aforementioned U.S. Pat. No. 4,262,202 may also be used. The front wall member 14 is comprised of a material which is highly nonabsorptive of x-ray or gamma-ray radiation. Suitable materials for front wall member 14 include aluminum, beryllium, other low Z (atomic number) materials, quartz, and engineering thermoplastics. Collimator plate members 3 are comprised of highly flat, uniform thickness, high Z materials such as tungsten, tantalum, or molybdenum. The material used for rear wall member 11 is not critical, but it may, if necessary, be a material which is highly impervious to x-ray or gamma-ray radiation so that residual, nonabsorbed radiation energy is prevented from escaping into the surrounding environment. The interior surfaces of front wall member 14, rear wall member 11, and collimator plates 3 are, in the preferred embodiment, coated with an optically reflective material so that light (in the visible as well as in the near visible regions of the spectrum which include infrared and ultraviolet wavelengths) generated by the scintillator bodies placed within the volumes defined is eventually directed to photoelectrically responsive detectors 8, each of which is positioned respectively on a base 9 of triangular chambers 6. Electrical output leads 13 of detectors 8 are connected to data acquisition channels (not shown) for analysis by conventional computerized tomographic means. Typically, in such computerized tomographic devices, a fan shaped x-ray beam, represented by arrows 50, is used to provide the excitation for scintillator bodies 5. The resultant light output from scintillator bodies 5 is directed to photo-electrically responsive detectors 8 by a reflective coating 15 applied to the internal surfaces of the volumes defined by wall members 3, 11, and 14.

The optically reflective coating 15 may be diffuse or specular. By way of example, a diffuse reflecting surface is provided by coating the the interior of wall members 3, 11, and 14 with a thin coating of barium sulfate (BaSO$_4$) or magnesium oxide (MgO). If a specular reflecting surface is desired, then wall members 3, 11, and 14 may be, for example, coated with silver or gold by evaporation. Other reflective materials may also be used but if such materials contain high Z atomic elements, then it is desirable that the thickness of such coating on front wall member 14 be kept to a minimum so that x-ray beam 50 is not significantly attenuated before absorption in scintillator bodies 5 occurs. The reflective material is applied, for example, by either evaporation or deposition.

Photoelectrically responsive detectors 8 may conveniently comprise silicon photodiodes. Detectors 8 are selected to be responsive to optical wavelength radiation comprising not only the visible region of the spectrum but also those near-visible regions which encompass the radiation emitted by some scintillators in the infrared or ultraviolet regions. Photodetectors 8 mounted on bases 9 of triangular chambers 6 are situated out of the direct trajectory of x-ray beam 50. This is desirable since exposure of the detectors 8 to prolonged x-ray bombardment (by x-rays not absorbed by scintillation bodies) results in deterioration of their performance and efficiency. Furthermore, the detectors themselves will show response due to direct x-rays which pass through or by the edges of scintillators and cause poor channel-to-channel signal uniformity.

Figure 2:
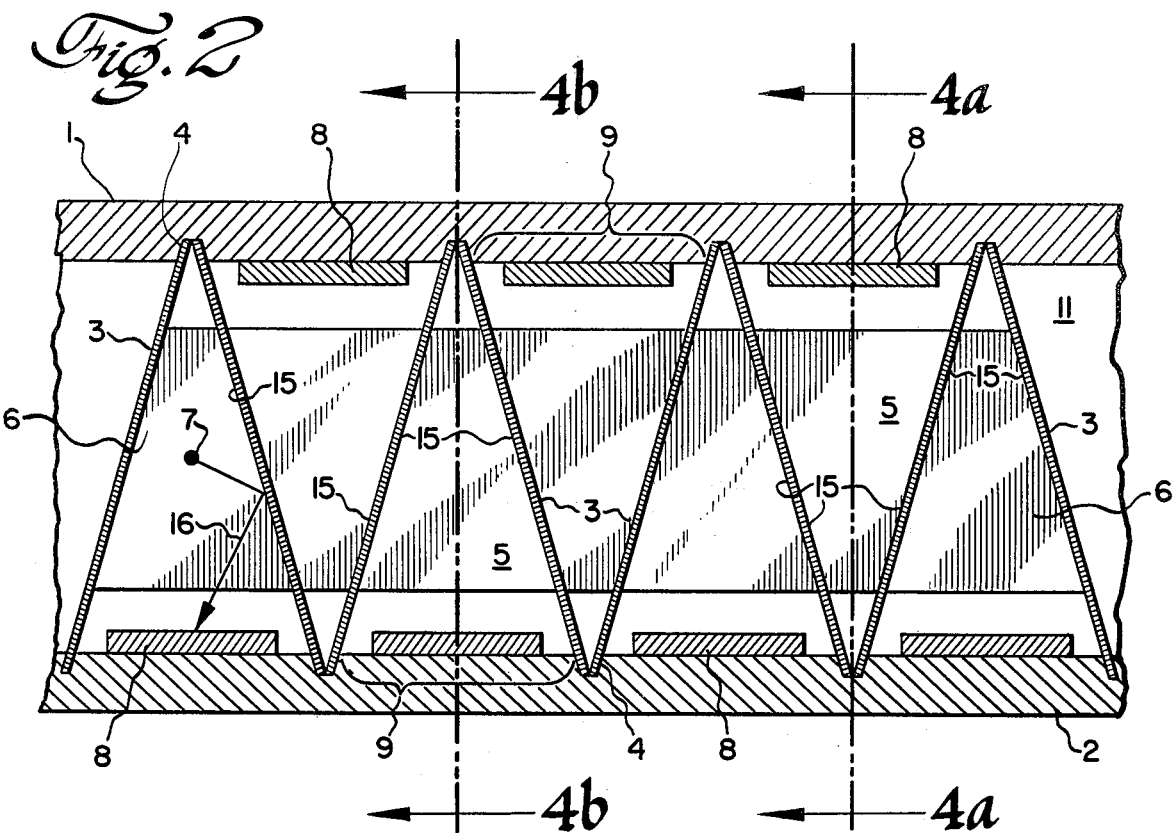
FIG. 2 is a partial front sectional view of the embodiment shown in FIG. 1.

FIG. 2 is a partial, front sectional, view taken along line 2—2 of FIG. 1. FIG. 2 illustrates in greater detail the zig-zag configuration of collimator plates defining the triangular cells of the inventive array. Upper and lower, spaced apart, parallel frame members 1 and 2, respectively, are provided with a plurality of equally spaced, accurately machined slots 4. The slots 4 on upper and lower frame members 1 and 2, respectively, are displaced laterally with respect to each other by a distance of one-half the width between adjacent slots. Thus, when collimator plates 3 are positioned in the slots 4, a plurality of triangular chambers 6 result. The base 9 of any triangular chamber 6, on which a photodetector 8 is mounted, is defined by the distance between two adjacent slots 4 on the upper or lower frame members 1 and 2, respectively. Each triangular chamber 6 shares a collimator plate 3 with the adjacent chambers 6 so that each chamber has a common side wall respectively with each of the adjacent chambers.

In the embodiment illustrated in FIG. 2, a wedge shaped solid scintillator body 5 is positioned within the chamber 6. The scintillator body 5 may be formed for example, from such scintillator materials as cesium iodide enriched with thallium (CsI:Tl), cadmium tungstate ($CdWO_4$). Other suitable materials may comprise the transparent scintillator bodies produced by hot-pressing and hot-forging such as those described in U.S. Pat. No. 4,242,221, issued Dec. 30, 1980 to D. A. Cusano et al, which is assigned to the same assignee as the present invention and which is incorporated herein by reference. Also suitable for use in the present invention are distributed phosphor scintillator structures in which the phosphor is distributed in either a continuous or layered fashion within or between a transparent matrix material and which are disclosed in U.S. Pat. No. 4,230,510 issued Oct. 28, 1980 to D. A. Cusano et al and which is assigned to the same assignee as this application, and incorporated herein by reference. U.S. Pat. No. 4,316,817 issued Feb. 23, 1982 D. A. Cusano et al, which is assigned to the same assignee as this application and which is also incorporated herein by reference, discloses a scintillator body useful in the present detector array, in which the phosphor, barium fluorochloride enriched with europium (BaFCl:Eu), for example, is distributed continuously throughout a transparent matrix material whose index of refraction is matched to that of the phosphor material. The latter scintillator body is particularly useful in this array since the body can be shaped in a mold closely resembling array chamber 6, to thereby provide superior scintillation body conformance with the geometry of the chamber thusly eliminating costly machining or grinding steps.

The use of the wedge-shaped scintillation bars in the array of the invention results in a particularly desirable scintillation detector array. In accordance with this embodiment, illustrated in FIG. 2, scintillation bodies 5 are shaped by conventional techniques (such as machining) into precise wedges which are then force-fitted (i.e., pushed) into complementarily shaped chambers 6 and essentially locked in place by friction. Such construction results in a rigid array in which the edges of scintillator bodies 5 closely abut the adjacent collimator plates 6, greatly reducing the incidence of gaps therebetween. Elimination of the gaps is desirable since not only are x-rays prevented from passing through the gaps and thereby escaping detection (loss of detector efficiency), but such x-rays undergo Compton-scattering leading to spurious detector response causing image artifacts to occur. With this type of construction, greater channel uniformity is also achievable since by selectively adjusting the depth to which the wedges are force-fitted into each chamber, chamber size and scintillator body position may be adjusted as required. An additional advantage accruing from this construction is the reduction of thermal sensitivity associated with geometrical distortions of incompletely filled parallel plate arrays. The distortions are due to variations in ambient array temperature which causes collimator plates 3 to bend. Since not all of collimator plates 3 distort in the identical direction or to the same extent, the precise configuration of the array is lost, giving rise to artifacts which degrade image quality.

To illustrate the focusing action of the collimator plates 3 in directing optical radiation emitted by scintillator body 5 to the photodetectors 8, FIG. 2 shows an exemplary x-ray absorption site 7. Optical photons are generated at site 7 by the impinging x-ray beam 50. A typical path of one such photon is illustrated by a light path 16 which shows the optical photons being reflected by reflective coating 15 on the interior surface of the collimator plate 3 toward the photodetector 8. It is due, in part, to the increased light collection resulting from such focusing action that the inventive array provides improved light collection over the parallel plate, single photodiode in chamber, scintillation detector array.

Figure 3A:
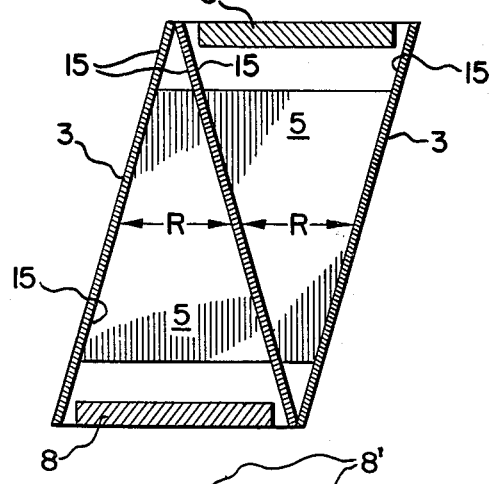
FIGS. 3a and 3b provide a diagrammatic comparison between a pair of cells of the inventive array and a pair of cells of the conventional parallel plate array with respect to image resolution and the number of photodetectors required for each.
Figure 3B:
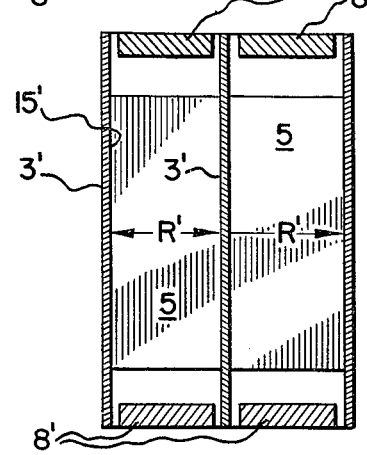

The inventive array provides the same resolution as the parallel plate detector but utilizes half as many photodiodes. This is illustrated in FIGS. 3a and 3b, respectively. The average resolution of the array shown in FIG. 3a is determined by chamber width designated R. In this array, each chamber is equipped with a single photodetector 8. An equivalent resolution parallel plate array having a chamber width R', equal to width R of FIG. 3a, is shown in FIG. 3b. Each chamber of the parallel plate array is provided with two photodetectors 8'.

FIGS. 4a and 4b are side, sectional, views of a scintillator detector embodiment such as illustrated in FIG. 2, but additionally showing optional x-ray transmissive, optically reflective members 18. The view of FIG. 4a is similar to that which would be taken along line 4a—4a of FIG. 2, bisecting a triangular chamber 6 having its base disposed along the upper frame member 1. Similarly, FIG. 4b depicts a view similar to that which would be taken along line 4b—4b of FIG. 2 through another chamber 6 having its base disposed along lower frame member 2. In each of FIGS. 4a and 4b, members 18 are positioned at an angle to the front and rear wall members 14 and 11, respectively, so as to define a substantially pyramidal chamber. A photodetector 8 is disposed along the base of the chamber, while a scintillator body 5 is positioned therein essentially as described in the embodiment of FIG. 2. The interior surfaces of the pyramidal chamber may be coated with a reflective material 15, which may comprise the same materials as previously described herein. Photons which would otherwise escape through the surfaces of scintillator body 5 parallel to front and rear wall members 14 and 11 are reflected toward photodetector 8 by reflectively coated members 18. This action is illustrated by an exemplary absorption site 19 and typical optical path 20. The reflective members 18 may comprise the same low Z materials as those described as suitable for the front wall member 14.

From the foregoing, it will be appreciated that the scintillation detector array of the present invention offers significant improvements over parallel plate scintillation detector arrays. More specifically, the present invention provides a scintillation detector array which is operable with a variety of scintillator materials and which features improved signal-to-noise performance, lower thermal sensitivity, and cost-efficient construction.

While the invention has been described with reference to particular embodiments and examples, other modifications and variations will occur to those skilled in the art in view of the above teachings. Accordingly, it should be understood that within the scope of the appended claims, the invention may be practiced otherwise than as specifically described.

The invention claimed is:

1. A scintillation detector array for use in computerized tomography apparatus comprising:
   a housing having a front wall section substantially transparent to x-ray radiation and a rear wall section;
   a plurality of adjacent triangular prism shaped chambers disposed within said housing such that said chambers are defined, at least in part, by a plurality of side wall members which are disposed orthogonally to said x-ray transparent front wall section and which are opaque to x-ray radiation, said chambers having alternate, oppositely disposed bases, a plurality of said chambers containing a scintillation medium; and
   a photodetector positioned on the base of each of said chambers to detect optical wavelength photons generated by x-rays exciting said scintillation medium after passing through said substantially x-ray transparent front wall section.

2. The scintillation detector array of claim 1 wherein said scintillation medium comprises one of the group consisting of CsI:Tl, CdWO$_4$, and BaFCl:Eu.

3. The scintillation detector array of claim 1 wherein said side walls comprise x-ray opaque material selected from the group consisting of tungsten, tantallum, and molybdenum.

4. The scintillation detector array of claim 1 wherein said side walls are coated with optically reflective material.

5. The scintillation detector array of claim 1 wherein said x-ray transparent wall section comprises a material selected from the group consisting of aluminum, beryllium, quartz and engineering thermoplastics.

6. The scintillation detector array of claim 1 where said adjacent triangular prism shaped chambers have common side walls.

7. The scintillation detector array of claim 1 wherein said scintillation medium comprises a liquid scintillator material.

8. The scintillation detector array of claim 1 further comprising at least one, optically reflective, sustantially x-ray transparent member disposed within said chambers and angled with respect to said front and rear wall sections to reflect toward said photodetector photons produced by said scintillation medium.

9. The scintillator detector array of claim 1 wherein said scintillation medium comprises a triangular prism shaped scintillator material force-fitted into said triangular prism shaped chambers.

10. The scintillation detector array of claim 1 wherein said triangular prism shaped chambers comprise:
    two parallel, flat, rectangularly shaped frame members, each containing a plurality of equally spaced, parallel slots, such that the areas between said slots form the bases of said alternately disposed, triangular prism shaped chambers;
    said side wall members comprising a plurality of flat, rectangularly shaped plates disposed between said frame members such that one edge of each plate fits into one of said slots of one of said frame members and the opposite edge fits into one of said slots of the said opposite frame member, and such that each said plate forms a common side wall for two adjacent triangular prism shaped chambers.

11. The scintillation detector array of claim 1 wherein said scintillation medium comprises a triangular prism shaped scintillator material force-fitted into said triangular prism shaped chambers and wherein said triangular prism shaped chambers comprise:
    two parallel, flat, rectangularly shaped frame members, each containing a plurality of equally spaced parallel slots, such that the areas between said slots form the bases of said alternately disposed, triangular prism shaped chambers;
    said side wall members comprising a plurality of flat, rectangularly shaped plates disposed between said frame members such that one edge of each plate fits into one of said slots of one of said frame members and the opposite edge fits into one of said slots of the said opposite frame member, and such that each said plate forms a common side wall for two adjacent triangular prism shaped chambers.

12. The scintillation detector array of claim 1 wherein said scintillator medium is disposed within said chambers such that said chamber walls protrude in front of said scintillator medium, toward said front wall section.

* * * * *